(12) United States Patent
Lerner et al.

(10) Patent No.: US 9,507,858 B1
(45) Date of Patent: Nov. 29, 2016

(54) SELECTIVELY MERGING CLUSTERS OF CONCEPTUALLY RELATED WORDS IN A GENERATIVE MODEL FOR TEXT

(71) Applicant: GOOGLE INC., Mountain View, CA (US)

(72) Inventors: Uri N. Lerner, Los Altos, CA (US); Michael E. Jahr, San Francisco, CA (US)

(73) Assignee: Google Inc., Mountain View, CA (US)

( * ) Notice: Subject to any disclaimer, the term of this patent is extended or adjusted under 35 U.S.C. 154(b) by 240 days.

(21) Appl. No.: 13/686,781

(22) Filed: Nov. 27, 2012

Related U.S. Application Data

(63) Continuation of application No. 11/712,873, filed on Feb. 28, 2007, now abandoned.

(51) Int. Cl.
*G06F 7/00* (2006.01)
*G06F 17/30* (2006.01)

(52) U.S. Cl.
CPC .............. *G06F 17/30722* (2013.01)

(58) Field of Classification Search
CPC .................................. G06F 17/30722
USPC ........................................ 707/797
See application file for complete search history.

(56) References Cited

U.S. PATENT DOCUMENTS

| | | |
|---|---|---|
| 5,794,050 A | 8/1998 | Dahlgren et al. |
| 5,815,830 A | 9/1998 | Anthony |
| 6,078,914 A | 6/2000 | Redfern |
| 6,137,911 A | 10/2000 | Zhilyaev |
| 6,622,139 B1 | 9/2003 | Nakayama et al. |
| 6,651,054 B1 | 11/2003 | Judicibus |
| 6,684,205 B1 | 1/2004 | Modha et al. |
| 6,751,611 B2 | 6/2004 | Krupin et al. |
| 6,820,093 B2 | 11/2004 | De la Huerga |
| 7,013,298 B1 | 3/2006 | De la Huerga |
| 7,289,985 B2 | 10/2007 | Zeng et al. |
| 7,305,389 B2 | 12/2007 | Zeng et al. |
| 7,363,308 B2 | 4/2008 | Dillon et al. |
| 7,739,253 B1 | 6/2010 | Yanovsky et al. |
| 2002/0087310 A1 | 7/2002 | Lee et al. |
| 2002/0120619 A1 | 8/2002 | Marso et al. |

(Continued)

OTHER PUBLICATIONS

Graham, I., "The HTML Sourcebook," John Wiley & Sons, 1995 (ISBN 0471118494) (pages on "partial URLs" and "BASE element," e.g., pp. 22-27; 87-88; 167-168).

(Continued)

*Primary Examiner* — Van Oberly
(74) *Attorney, Agent, or Firm* — Fish & Richardson P.C.

(57) ABSTRACT

One embodiment of the present invention provides a system that merges similar clusters of conceptually-related words in a probabilistic generative model for textual documents. During operation, the system receives a current model, which contains terminal nodes representing random variables for words and contains cluster nodes representing clusters of conceptually related words. Nodes in the current model are coupled together by weighted links, wherein if a node fires, a link from the node to another node causes the other node to fire with a probability proportionate to the weight of the link. Next, the system determines whether cluster nodes in the current model explain other cluster nodes in the current model. If two cluster nodes explain each other, the system merges the two cluster nodes to form a combined cluster node.

21 Claims, 11 Drawing Sheets

(56) References Cited

U.S. PATENT DOCUMENTS

| | | | |
|---|---|---|---|
| 2002/0138478 A1* | 9/2002 | Schwartz | G06F 17/30687 |
| 2003/0028557 A1* | 2/2003 | Walker | G06F 17/2229 |
| | | | 715/201 |
| 2003/0037041 A1 | 2/2003 | Hertz | |
| 2003/0088562 A1 | 5/2003 | Dillon et al. | |
| 2004/0068697 A1* | 4/2004 | Harik | G06F 17/30616 |
| | | | 715/234 |
| 2004/0088308 A1 | 5/2004 | Bailey et al. | |
| 2004/0193636 A1* | 9/2004 | Black | G06F 17/30864 |
| 2004/0220963 A1 | 11/2004 | Chen et al. | |
| 2004/0249789 A1 | 12/2004 | Kapoor et al. | |
| 2005/0234880 A1 | 10/2005 | Zeng et al. | |
| 2005/0234973 A1* | 10/2005 | Zeng | G06N 5/02 |

OTHER PUBLICATIONS

Mills, T., "Providing world wide access to historical sources," Computer Networks and ISDN Systems, vol. 29, Nos. 8-13, Sep. 1997, pp. 1317-1325.

Myka, A., Automatic Hypertext Conversion of Paper Document Collections (ch. 6), Digital Libraries Workshop DL '94, Newark, NJ, May 1994 (selected papers), pp. 65-90.

Notice of Allowance for related U.S. Appl. No. 10/676,571, mailed from USPTO on Sep. 30, 2003.

Notice of Allowance for related U.S. Appl. No. 10/788,837, mailed from USPTO on Feb. 26, 2004.

Office Action for related U.S. Appl. No. 10/788,837, mailed from USPTO on Feb. 26, 2004.

Office Action for related U.S. Appl. No. 10/676,571, mailed from USPTO on Sep. 30, 2003.

Publication entitled, "Hidden Markov Decision Trees," by Michael I. Jordan et al., 1997, Center for Biological and Computational Learning Massachusetts Institute of Technology and Department of Computer Science, University of Toronto, Canada.

Publication entitled, "Asymptotic Model Selection for Directed Networks with Hidden Variables," by Dan Geiger et al., May 1996, Technical Report MSR-TR-96-07, Microsoft Research, Advanced Technology Division.

Publication entitled, "Learning Bayesian Networks: The Combination of Knowledge and 9," Microsoft Research, Advanced Technology Division.

Publication entitled, "Estimating Dependency Structure as a Hidden Variable," by Marina Meila et al., Massachusetts Institute of Technology, A.I. Memo No. 1648, C.B.C.L. Memo No. 165, Sep. 1998.

Thistlewaite, P., "Automatic construction and management of large open webs," Information Processing and Management: an International Journal, vol. 33, Issue 2, Mar. 1997, pp. 161-173 (ISSN 0306-4573).

Wang et al., "Link Based Clustering of Web Search Results," Jul. 2001, in $2^{nd}$ International Conf. on Advances in Web-Age Information Management, pp. 1-12.

\* cited by examiner

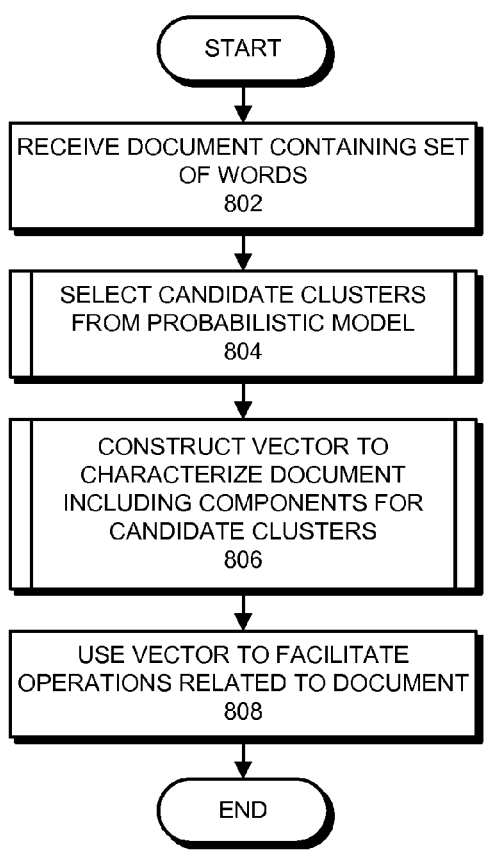
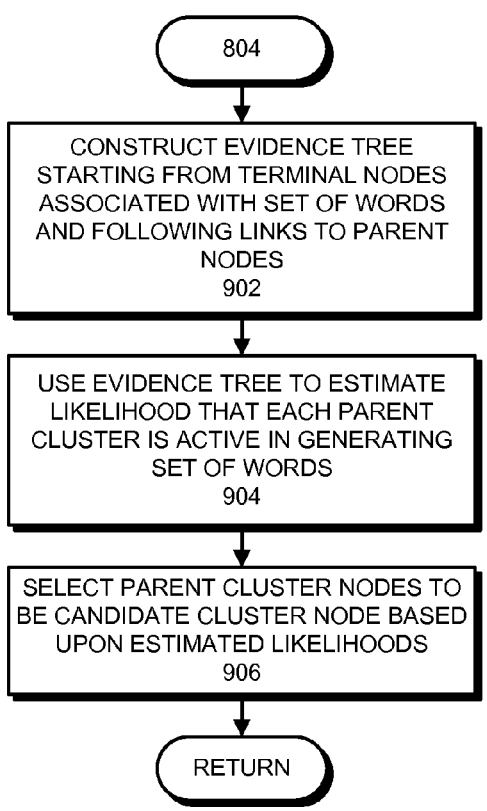
FIG. 8
FIG. 9

SELECTIVELY MERGING CLUSTERS OF CONCEPTUALLY RELATED WORDS IN A GENERATIVE MODEL FOR TEXT

CROSS-REFERENCE TO RELATED APPLICATIONS

This application is a continuation of, and claims priority to, pending U.S. patent application Ser. No. 11/712,873, filed on Feb. 28, 2007, entitled "SELECTIVELY MERGING CLUSTERS OF CONCEPTUALLY RELATED WORDS IN A GENERATIVE MODEL FOR TEXT," the entirety of which is hereby incorporated by reference.

BACKGROUND

Field of the Invention

The present invention relates to techniques for modeling textual documents. More specifically, the present invention relates to a technique for selectively merging clusters of conceptually related words in a probabilistic generative model for textual documents, wherein the model characterizes textual documents based on clusters of conceptually related words.

Related Art

Processing text in a way that captures its underlying meaning—its semantics—is an often performed but poorly understood task. This function is most often performed in the context of search engines, which attempt to match documents in some repository to queries by users. It is sometimes also used by other library-like sources of information, for example to find documents with similar content. In general, understanding the semantics of text is an extremely useful functionality in such systems. Unfortunately, most systems written in the past have only a rudimentary understanding of text, focusing only on the words used in the text, and not the meaning behind them.

As an example, consider the actions of a user interested in finding a cooking class in palo-alto, California. This user might type into a popular search engine the set of words "cooking classes palo alto". The search engine then typically looks for those words on web pages, and combines that information with other information about such pages to return candidate results to the user. Currently, if the document has the words "cooking class palo alto" several of the leading search engines will not find it, because they do not know that the words "class" and "classes" are related, because one is a subpart—a stem—of the other.

Prototype systems with stemming components have been attempted but without any real success. This is because the problem of determining whether a stem can be used in a particular context is difficult. That might be determined more by other nearby words in the text rather than by the word to be stemmed itself. For example, if one were looking for the James Bond movie, "for your eyes only", a result that returned a page with the words "for your eye only" might not look as good.

One existing system characterizes a document with respect to clusters of conceptually related words. For example, see U.S. patent application Ser. No. 10/676,571 entitled, "Method and Apparatus for Characterizing Documents based on Clusters of Related Words," by inventors George Harik and Noam Shazeer, filed 30 Sep. 2003. This system uses clusters of conceptually related words to capture a significant amount of semantic meaning within text.

These clusters are formed during a training phase which uses a large number of documents to form a generative model for the text in these documents. During this training process, it is common for separate clusters to form for similar topics. For example, separate clusters may form for "George Bush jokes," and "George Bush memorabilia." It is desirable to merge such similar clusters into a combined cluster which will do a better job of generalizing. Unfortunately, existing systems provide no automated mechanism for merging such similar clusters.

Hence, what is needed is a method and an apparatus that facilitates automatically merging similar clusters of conceptually related words in a generative model for textual documents.

SUMMARY

One embodiment of the present invention provides a system that merges similar clusters of conceptually-related words in a probabilistic generative model for textual documents. During operation, the system receives a current model, which contains terminal nodes representing random variables for words and contains cluster nodes representing clusters of conceptually related words. Nodes in the current model are coupled together by weighted links, wherein if a node fires, a link from the node to another node causes the other node to fire with a probability proportionate to the weight of the link. Next, the system determines whether cluster nodes in the current model explain other cluster nodes in the current model. If two cluster nodes explain each other, the system merges the two cluster nodes to form a combined cluster node.

In a variation on this embodiment, while determining whether cluster nodes in the current model explain other cluster nodes, the system analyzes each given cluster node in the current model. In doing so, the system forms a query which includes words associated with the given cluster node. Next, the system runs the query against the current model minus the given cluster node to produce a set of resulting cluster nodes. Finally, if the activation strength of a resulting cluster node exceeds a threshold, the system determines that the resulting cluster node explains the given cluster node.

In a variation on this embodiment, merging the two cluster nodes involves: (1) merging parents of the two cluster nodes to produce a set of parents for the combined cluster node; (2) merging children of the two cluster nodes to produce a set of children for the combined cluster node; and (3) if a given cluster node is a parent of one cluster node and a child of the cluster node, the system makes the given cluster node a child but not a parent of the combined cluster node.

In a further variation, if merging the two cluster nodes causes two weighted links to exist from a given parent node to the combined cluster node, or from the combined cluster node to a given child node, the system combines the two weighted links into a single combined weighted link.

In a variation on this embodiment, the system additionally performs training operations. These training operations involve iteratively: (1) receiving a set of training documents, wherein each training document contains a set of words; (2) applying the set of training documents to the current model to produce a new model; and (3) making the new model the current model.

In a further variation, while applying the set of training documents to the current model, the system applies the set of training documents to the links defined in the current model to produce functions for weights for corresponding links in the new model. The system then optimizes the functions to produce weights for links in the new model.

In a further variation, producing the new model additionally involves selectively introducing new cluster nodes into the current model.

In a further variation, producing the new model additionally involves selectively introducing new links from cluster nodes to terminal nodes and from cluster nodes to other cluster nodes.

BRIEF DESCRIPTION OF THE FIGURES

FIG. 8 presents a flow chart of the characterization process in accordance with an embodiment of the present invention.

FIG. 9 presents of a flow chart of the process for selecting candidate clusters in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

The System

One embodiment of the present invention provides a system that learns concepts by learning an explanatory model of text. In the system's view, small pieces of text are generated in a fairly simple, but incredibly powerful way, through the execution of probabilistic network. The system learns the parameters of this network by examining many examples of small pieces of text.

One embodiment of the system considers the important information in a piece of text to be the words (and compounds) used in the text. For example in the query "cooking classes palo alto" the words are "cooking" and "classes", and the compounds consist of the simple compound "palo alto". Distinguishing compounds from words is done on the basis of compositionality. For example, "cooking classes" is not a compound because it is about both cooking and classes. However "palo alto" is not about "palo" and "alto" separately. This is sometimes a hard distinction to make, but good guesses can make such a system better than no guesses at all.

What this means is that the system simplifies the analysis of text by not considering the order of the words in the text. For example, one embodiment of the present invention does not distinguish the above from "palo-alto classes cooking" (we use dashes in this specification to connect the components of compounds). We will refer to both words and compounds as "terminals". (We will see later this is because in our model of the world, they do not generate words, as opposed to concepts, which do generate words.) This simplification means that the system treats segments of text as a set of terminals.

Probabilistic Model for Text Generation as a Set of Terminals

Figure 1:
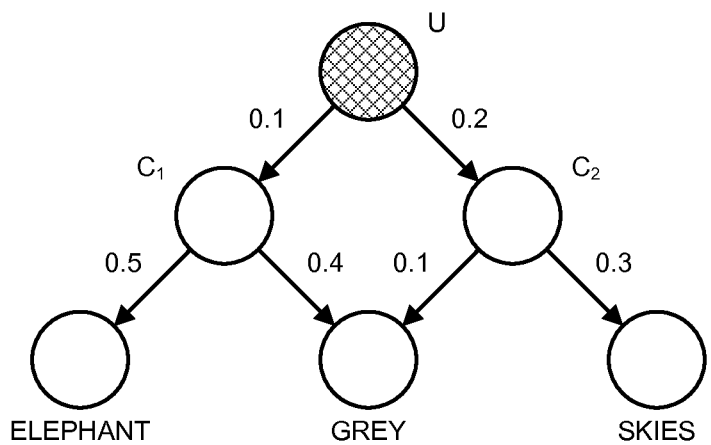
FIG. 1 illustrates a probabilistic model in accordance with an embodiment of the present invention.

Let's look at what a system that generated text as a set of words might look like. FIG. 1 shows one such model. Here, the circles are called model nodes. These nodes represent random variables, each of which models the existence or non-existence of concepts or terminals. The only terminals we are considering in this model are "elephant", "grey" and "skies". There are two concepts, called $C_1$ and $C_2$ (because they are used to generate related words, concepts are sometimes referred to as clusters).

This model might be used for example to explain why the words grey and skies often occur together, why the words grey and elephant often occur together, but yet why the words "elephant" and "skies" rarely occur together. It is because when people are generating text with these words, they have ideas in mind. The system's concepts are supposed to model the ideas in a person's mind before they generate text.

Note that there is a darker node at the top of the figure without a name. This is the universal node, U, which is always active. When modeling text, it is always active, and all concepts come from it. The arrows exiting any concept are called links. These links imply that when a user thinks of one concept, they are likely to think of another concept or write another terminal afterwards. For example, the concept $C_1$ links to the words 'elephant' and 'grey'. That means that after a user thinks of $C_1$, they often write out the words 'elephant' and/or 'grey'. In particular, the numbers on the links are important. They represent the probabilities of certain events. The link between $C_1$ and 'elephant' means that after thinking of $C_1$, a user thinks of the word elephant with probability 0.5. These numbers are often referred to as the 'weights' on the links.

This model can be used or "executed" to generate text. When we are doing this, we begin at the Universal node (often called U), and consider it to exist in the mind of the generator. We will often say that the node is "active" or has "fired" to imply this. For concepts, firing means that the idea of that concept is active, and is able to fire terminals. For terminals, the idea of firing is that the terminals exist in the text to be generated.

Let us run through an example of how one such piece of text could be generated. In the example in FIG. 1, we would start out by assuming that the Universe is active. Then $C_1$ would fire with 0.1 probability. At this point, some random process would decide whether or not $C_1$ would fire or not. For this random process you could throw dice or use any random information. Usually, if this were taking place on a computational machine, a random number generator would be used. Many methods are adequate so long as we have some way of producing a decision, that turns out 9 out of 10 times to be no (0.9) and 1 out of 10 times to be yes (0.1). When it turns out to be yes, the concept $C_1$ is activated. When it turns out no, $C_1$ is not activated. A similar process is applied to $C_2$.

We will assume that for our example now, the random number generator has produced YES for the link Universe→$C_1$ and NO for the link Universe→$C_2$. At this point, $C_1$ is active. When a concept is active, we can then pick random numbers for the other concepts or terminals which have links originating from that active concept. In this example, now the words "elephant" and "grey" have a possibility of becoming active with probabilities of 0.5 and 0.4. Now let us assume that we get more random numbers (to make a simple analogy we will now refer to this as throwing dice) and decide that both elephant and grey are active. This means that we have our piece of text, it is the words "elephant" and "grey". Note that because in one embodiment of the present invention the word order is not modeled, we cannot distinguish "grey elephant" from "elephant grey" (unless they form a compound). In this way, we have generated a small piece of text.

Figure 2:
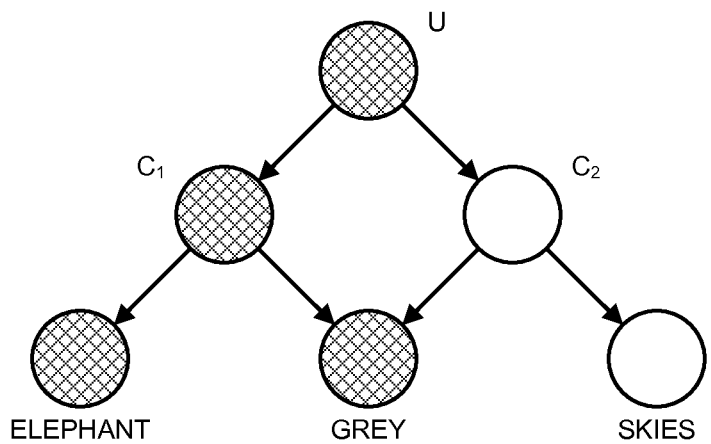
FIG. 2 illustrates a state of the probabilistic model in accordance with an embodiment of the present invention.

FIG. 2 shows this particular execution of the model detailed in FIG. 1. In this figure, we see the concept $C_1$ becoming active, we illustrate this graphically by darkening the node, and the words elephant and grey becoming active. This idea of graphically viewing the execution model of a piece of text is important from the standpoint of examining the whole system to see if it is operating correctly, and we will use it later on.

This seems like a lot of work to generate a grey elephant. Note however that the words we came up with have some meaning to us as people. This is because elephants are grey. In some small way, even this model in FIG. 1 captures a little bit about the state of the world. If only on the surface, this model captures the correlation between the words grey and elephant, grey and skies, but not elephant and skies.

Our system learns the intermediate concepts, the links and the link weights—in order to explain the co-occurrence of words and compounds in small pieces of text. In addition, its generative model is slightly more complicated than that above, in order to better be able to generate and explain text of various sizes (for example, queries are often 2-3 words, while documents are 1000 words or so).

Adjusting for Text of Various Sizes

For various reasons, the type of simple model above is slightly inadequate for dealing with text. A simple explanation for this is that each of the concepts produces a certain number of words, but finds it much more difficult for example to produce many words if the weights on the links are small. It would be desirable for example if a concept could produce either a few or many words from the terminals it points at.

Figure 3:
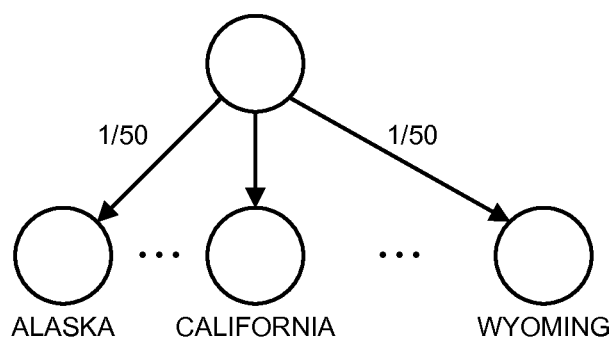
FIG. 3 illustrates a model representing states in the United States in accordance with an embodiment of the present invention.

FIG. 3 shows an example concept representing the states of the United States of America. In following our earlier model, the concept can fire terminals representing each of the 50 states, each with probability 1/50. Now, for this model to generate the word California alone is not that improbable. That probability is roughly $(1/50)*(49/50)^{49}$, which is approximately 0.7%. For this concept to fire all the states would be $(1/50)^{50}$ which is incredibly small. However, should we develop such a concept that covers the idea of the states of the United States, we would want it to explain pieces of text where all the states occur.

In order to address this problem, before it fires other terminals, each concept picks an activation level. Conceptually, this activation level chooses "how many" terminals are to be picked from this concept. Note that this activation level is not a quality of our model. In fact, it is only chosen when the model is being executed. What activation does is it modifies the probability that this concept fires each of its terminals (but not its sub-concepts, i.e. concept to concept linking is unaffected by activation).

The exact numerical adjustment can be as follows. If a link has a weight W and the cluster chooses activation A in its execution, and the link points between a concept and a terminal, then the concept fires the terminal with probability $(1-e^{-Aw})$. Here "e" the common mathematical number approximately 2.71. At first glance, this formulation seems odd, but it has the following nice properties: When W is very small (<0.01) and A is a small number (say 2) the probability is approximately equal to AW—so these numbers are easy to approximate in general. The reason they have an odd exponential form, is that probabilities have to have an upper limit of 1. So, having a link weight of 0.02 (1/50) and an activation of 100 should not give you a probability 2.0. The exponential form also has a number of other nice theoretical properties from a mathematical standpoint.

At this point, we have detailed almost all the individual pieces comprising of our model. One detail is the interaction between two or more clusters trying to fire the same terminal or cluster. In this case, each interaction is independent of the other. In particular, the probability that the result does NOT fire is the product of the probability that each cause does NOT fire it. For example, if three clusters $C_1$, $C_2$, $C_3$ link to a fourth cluster $C_4$ with weights 0.1, 0.2, 0.3 and $C_1$, $C_2$ and $C_3$ are active: $C_4$ does not fire with probability $(1-0.1)*(1-0.2)*(1-0.3)$ or $(0.9)*(0.8)*(0.7)$ or 0.504. Therefore, the chance is DOES fire is $1-(1-0.1)*(1-0.2)*(1-0.3)$ or $1-0.504=0.496$.

Bayesian Networks

At this point and before we proceed it is worthwhile to talk about a certain duality between the model we have been talking about and a certain class of probabilistic models called Bayesian Networks.

Bayesian networks are well-understood probabilistic modeling techniques in which conditional independences are asserted between various random variables in a joint distribution. As in the model above, Bayesian networks have nodes and directed links. These networks compactly represent a joint distribution over a number of random variables while structurally representing conditional independence assumptions about these variables.

In a Bayesian network, the set of nodes pointing to a node is called its "parents". The set of nodes reachable from a node via following links is called its "descendants" or "children"; and the structure implies that a node is independent of its non-descendants given its parents. The entire distribution is therefore encoded in the conditional probability tables of a child given its parents (nodes with no parents have their own distributions). The probability of a particular instantiation of the entire network is simply then the product of the probabilities of each child given its parents.

Bayesian networks are related to our model in the following way, if each node in the execution of our model is considered to be a random variable then the joint distribution over the set of nodes that are turned on is exactly that which arises from considering our model as a Bayesian network with noisy-or combination functions. Noisy-or conditional probabilities turn a boolean child on independently from each parent. That is, the probability of a child being off is the product of the probability that each parent does not fire it. Note this is exactly the combination function used in our model to decide if multiple active concepts that link to a terminal fire it. Note that Bayesian networks are themselves a subclass of more general probabilistic models.

Learning

At this point, we have gone over how an existing model could be used to generate text. We have not detailed a couple aspects of this work: (1) how our model is learned; (2) how our model is used to estimate the concepts present in text; and (3) how our model is used in practical situations. In this section, we will attempt to detail how our model is learned, and the various techniques that can be used for this purpose.

In learning a generative model of text, in one embodiment of the present invention some source of text must be chosen. Some considerations in such a choice are as follows: (1) it should have related words in close proximity; (2) it should present evidence that is independent, given the model we are trying to learn (more on this later); and (3) it should be relevant to different kinds of text. For this reason, the implementation of the model which follows uses exemplary "query sessions" from a search engine as its small pieces of text. We have also implemented and run our model on web pages and other sources of text, but for the purposes of making this exposition more concrete, we focus on the analysis of query sessions.

To be more precise, we generally define a query session (also referred to as a user session or a session) as any set of queries that are deemed to be relevant. For example, a query session can include a set of queries issued by a single user on a search engine over a fixed period of time. Note that while issuing queries, a user will often search for related material, issuing several queries in a row about a particular topic. Sometimes, these queries are interspersed with queries associated with other random topics. An example query session (not an actual one) might appear as follows:

the graduate
dustin hoffman
rain main
autism
cool junk
fast cars
tom cruise nicole kidman Each query here is on a separate line. Note that most of the words are related in some way. The first is a movie by Dustin Hoffman, as is the third. The second is Dustin Hoffman himself. The fourth deals with an issue brought up in the movie. The fifth query "cool junk" is not related to the main topic of the session, neither is the sixth "fast cars". The last is a little related because Tom Cruise acted in Rain Man with Dustin Hoffman. In general, there is a lot of information in such a small piece of text, using which we can draw conclusions, but there is also a lot of uncorrelated junk. The main task our system has is to cull out the proper correlations from the junk, while looking at a large number (billions) of such pieces of text.

Learning a probabilistic model that can explain all the words that occur together in queries is difficult. Note that in the explanation of the session above, we used information we had about the world in general to explain the query session. This is the nature of the information that our model learns in order to come up with a world model in which a session above is more than infinitesimally likely. Our approach to this problem is to use the well known Expectation Maximization (EM) algorithm.

Assume we do not know the model but we have a current guess about it (this guess may be very inaccurate). We use this guess to go over the training data and generate expected counts, e.g., how many times was a certain link active. By dividing this count by the total number of training instances we can transform the count to the probability that the link is active in any training instance. We then use these probabilities to update the model itself and iterate. We now explain this algorithm in more details in the context of our model.

Figure 4:
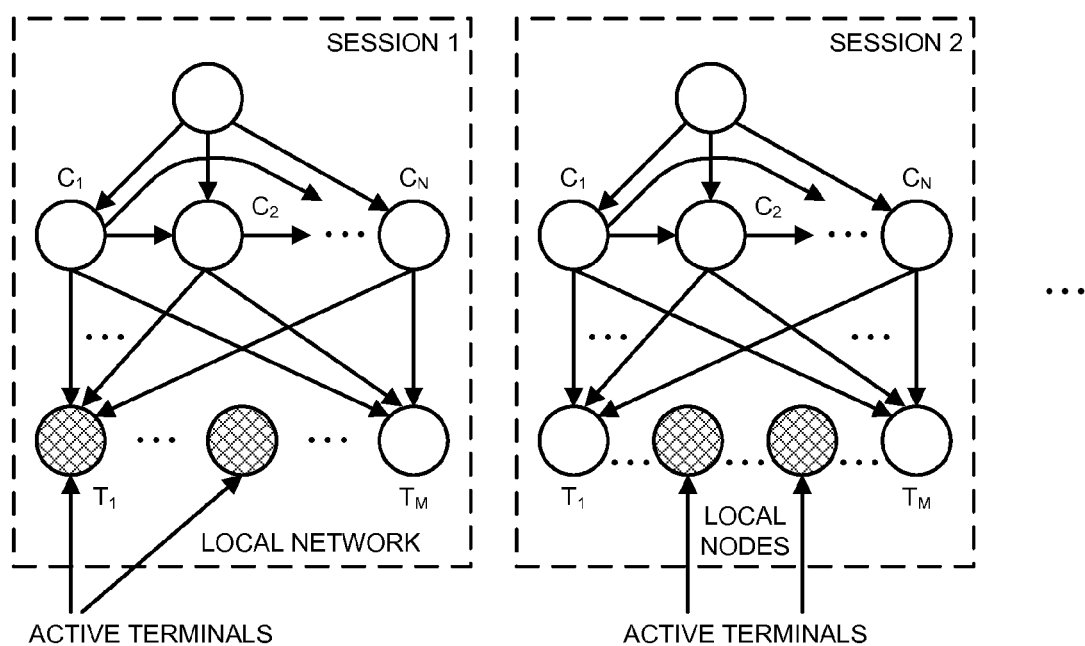
FIG. 4 illustrates global nodes and a number of local networks in accordance with an embodiment of the present invention.

Thus, we first need to come up with expected counts. To do so we create a local network for every training instance. FIG. 4 illustrates a number of local networks. In each local network, the terminals for a particular user session are assumed to be active. Note that our model is replicated for each such session. This is because what we observe for each session is only the words that the user used, and not in fact that concepts that were active in the user's mind when those words came about! The local nodes here represent our uncertainty about these concepts. Because the user may have been thinking of anything when they wrote each word they wrote, all concepts have to be considered in each local network.

Figure 5:
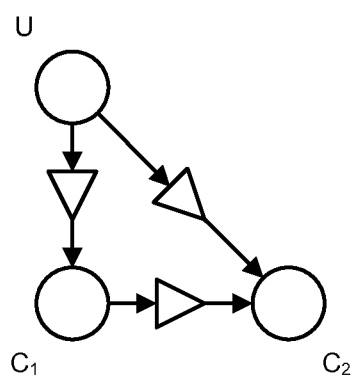
FIG. 5 illustrates a reworked model in accordance with an embodiment of the present invention.

FIG. 5 shows a slightly reworked version of the model, where variables exist to explicitly show whether or not each concept triggers another concept or terminal. Note that the joint distributions implied by both are the same, once they are projected to the original variables we are interested in (i.e. $C_1$ and $C_2$). The triangles in this figure represent extra "trigger" variables, and it is often helpful to think about the model with them because they simplify the number of conditional probabilities that are required.

For example, in FIG. 5, the "trigger" variable between U and $C_2$ only needs to know the distributions of U and the weight of the link from U to $C_2$ to decide the probability that $C_2$ gets fired from U. Similarly the other trigger into $C_2$ only needs to know the values of the $C_1$ and weight of the link from $C_1$ to $C_2$.

During the training process, the system maintains counters for links and prospective links in the current model to count the expected number of times they are activated during the training process, where the expectation is over the probability that the trigger variables are activated given the training data Next, the system applies expectation maximization (EM) to the expected counts to produce weights for links in the new model.

Crawling Ranking and Searching Processes

Figure 6:
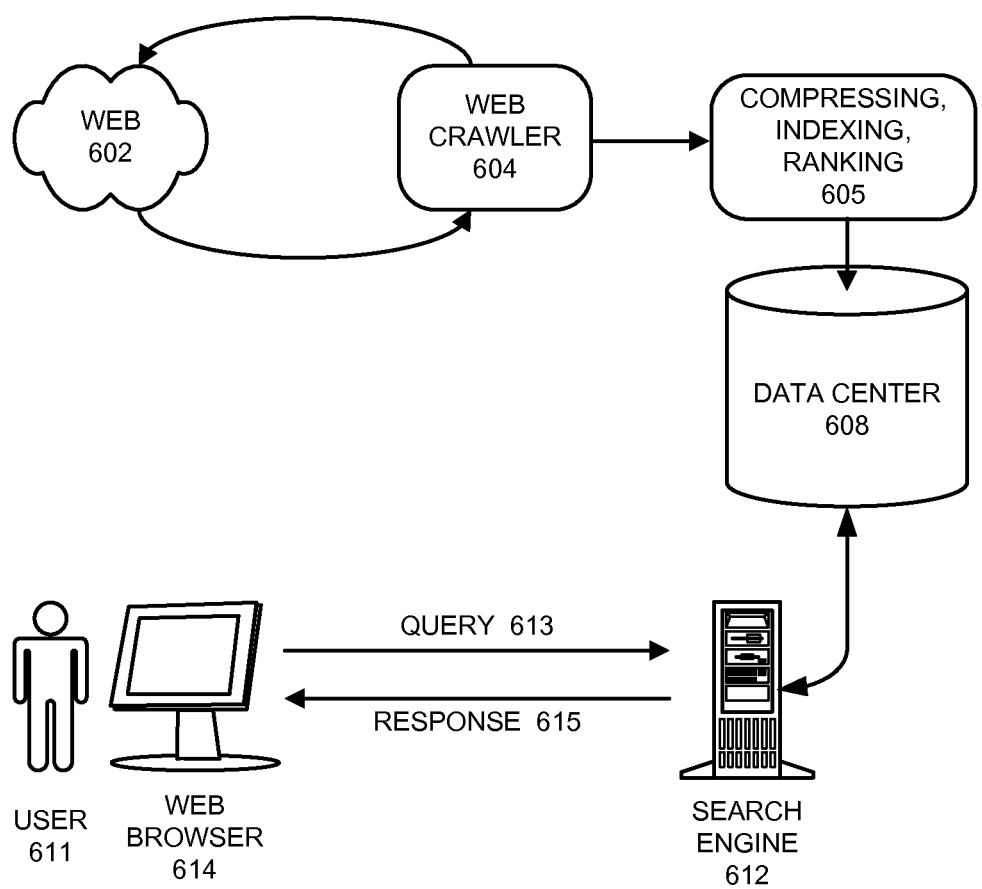
FIG. 6 illustrates the crawling, ranking and searching processes in accordance with an embodiment of the present invention.

FIG. 6 illustrates the crawling, ranking and searching processes in accordance with an exemplary embodiment of the present invention. During the crawling process, a web crawler 604 crawls or otherwise searches through websites on web 602 to select web pages to be stored in indexed form in data center 608. The selected web pages are then compressed, indexed and ranked in module 605 (using the ranking process described above) before being stored in data center 608.

During a subsequent searching process, a search engine 612 receives a query 613 from a user 611 through a web browser 614. This query 613 specifies a number of terms to be searched for in the set of documents. In response to query 613, search engine 612 uses search terms specified in the query to identify highly-ranked documents that satisfy the query. Search engine 612 then returns a response 615 through web browser 614, wherein the response 615 contains matching pages along with ranking information and references to the identified documents.

Note that during the searching and/or ranking processes, the system can characterize the documents (and query phrases) based on the clusters of conceptually related words to improve the searching and/or ranking processes.

Process of Characterizing a Document

Figure 7:
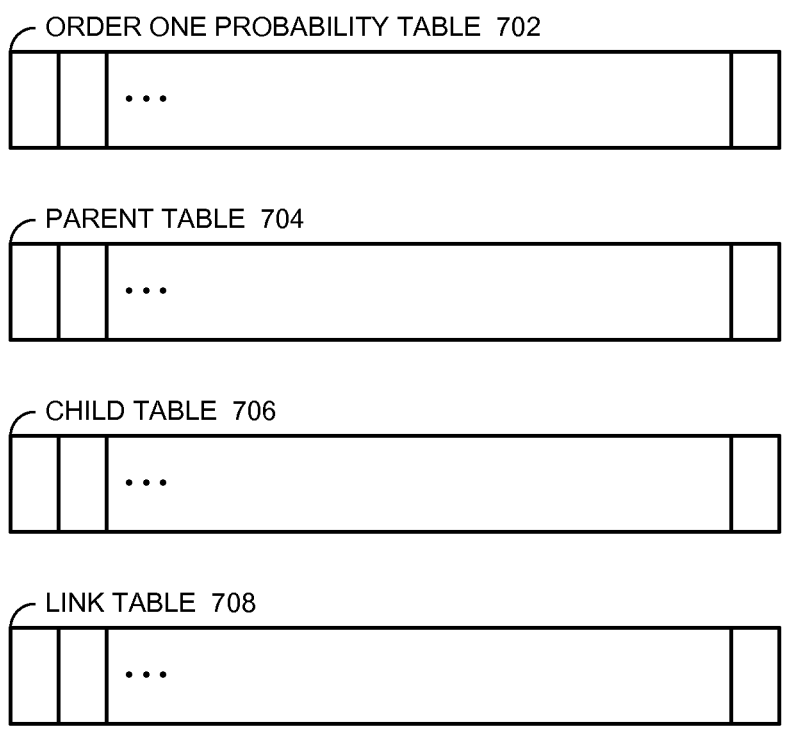
FIG. 7 illustrates data structures involved in characterizing a document in accordance with an embodiment of the present invention.

FIG. 7 illustrates data structures involved in characterizing a document in accordance with an embodiment of the present invention. These data structures include, order one probability table 702, parent table 704, child table 706 and link table 708.

Order one probability table 702 includes entries for each node in the probabilistic model that approximate the order one (unconditional) probability that the node is active in generating a given set of words. Hence, an entry in order one probability table 702 indicates how common an associated word or cluster is in sets of words that are generated by the probabilistic model. In one embodiment of the present invention, order one priority table 702 also includes an "activation" for each cluster node indicating how many links from the candidate cluster to other nodes are likely to fire.

Parent table 704 includes entries that identify parents of associated nodes in the probabilistic model, as well as the link weights from the identified parents.

Similarly, child table 706 includes entries that identify children of associated nodes in the probabilistic model, as well as the link weights to the identified children. (Note that child table 706 is optional; it is not necessary for most of the operations we discuss.)

Note that order one probability table 702, parent table 704 and child table 706 are pre-computed for the probabilistic model, prior to characterizing the document. On the other hand, link table 708 is populated during the process of characterizing a document.

Link table 708 includes entries for links to consider as evidence while constructing an evidence tree as is discussed below with reference to FIGS. 8-11. Each entry in link table 708 contains the weight for an associated link as well as the identifier for the associated parent node. Moreover, link table 708 can be sorted by parent identifier as is discussed below.

FIG. 8 presents a flow chart of the characterization process in accordance with an embodiment of the present invention. The system starts by receiving a document containing a set of words (step 802). Note that this document can include a web page or a set of terms (words) from a query.

Next, the system selects a set of "candidate clusters" from the probabilistic model that are likely to be active in generating the set of words (step 804). This process is described in more detail below with reference to FIG. 9. Note that by selecting a set of candidate clusters, the system limits the number of clusters that are considered in subsequent computational operations, thereby reducing the amount of computation involved in characterizing the document.

The system then constructs a vector (set of components) to characterize the document (step 806). This vector includes components for candidate clusters, wherein each component of the vector indicates a degree to which the corresponding candidate cluster was active in generating the set of words in the document. This process is described in more detail below with reference to FIGS. 10-11.

Finally, the system can use this vector to facilitate a number of different operations related to the document (step 808). Some of these uses are listed below in a following section of this specification entitled "Uses of the Model".

FIG. 9 presents of a flow chart of the process for selecting candidate clusters in accordance with an embodiment of the present invention. This flow chart describes in more detail the operations involved in performing step 804 in FIG. 8. The system starts by constructing an "evidence tree" starting from terminal nodes associated with the set of words in the document and following links to parent nodes (step 902). As a node is selected to be part of the evidence tree, links to the node from parent nodes are inserted into link table 808.

During the process of constructing the evidence tree, the system uses the evidence tree to estimate the likelihood that each parent cluster is active in generating the set of words (step 904). More specifically, in one embodiment of the present invention, for a cluster node $C_i$ that only points to terminal nodes, the system estimates the likelihood that $C_i$ was involved in generating the set of words (we refer to this estimated likelihood as the "Guess of $C_i$") using the following formula, $$\text{Guess}(C_i) = O1(C_i) \prod_j \frac{\tilde{P}(C_i \to w_j)}{\tilde{P}(w_j)}$$

wherein $$\tilde{P}(C_i \to w_j) = (\text{weight}_{C_i \to w_j})(\text{activation}_{C_i}),$$

and wherein $$\tilde{P}(w_j) = O1(w_j) \times (\# \text{ words}).$$

This formula indicates that the guess of $C_i$ is the order one probability of $C_i$ multiplied by a product of conditional probability contributions from active child nodes $w_j$ of $C_i$. The numerator of this contribution, $\tilde{P}(C_i \to w_j)$, is the weight of the link from $C_i$ to $w_j$ multiplied by a guess at the activation of $C_i$. Recall that the activation of $C_i$ is an indicator of the number of active links out of node $C_i$. The denominator of this contribution, $\tilde{P}(w_j)$, is the order one probability of $w_j$ multiplied by the number of words in the set of words.

For a cluster node, $C_i$, that points to other cluster nodes, the formula is slightly different, $$\text{Guess}(C_i) = O1(C_i) \cdot \text{Score}(C_i),$$

wherein $$\text{Score}(C_i) = \prod_k \text{Contribution}(C_k, C_i) \prod_j \text{Contribution}(w_j, C_i).$$

As in the case of a cluster node that only points to terminals, the guess of $C_i$ is the order one probability of $C_i$ multiplied by a product of conditional probability contributions. However, these conditional probability contributions come from other cluster nodes $C_k$ as well as from child nodes $w_j$.

The contribution from child nodes is the same as in the case where the cluster node that only points to terminals, $$\text{Contribution}(w_j, C_i) = \frac{\tilde{P}(C_i \to w_j)}{\tilde{P}(w_j)}.$$

The contribution from other cluster nodes is more complicated, $$\text{Contribution}(C_k, C_i) = \frac{P(C_k \mid C_i) \cdot \text{Score}(C_k) + 1 - P(C_k \mid C_i)}{P(C_k) \cdot \text{Score}(C_k) + 1 - P(C_k)},$$

wherein $P(C_k|C_i)$ is the conditional probability of $C_k$ given $C_i$, $P(C_k)$ is the order one probability of $C_k$, and $\text{Score}(C_k)$ is the previously calculated score of $C_k$. Note that since the evidence tree is constructed from terminals up, the score of the child node $C_k$ will have been computed before the score of the parent node $C_i$ is computed.

In one embodiment of the present invention, the system marks terminal nodes during the estimation process for a given cluster node to ensure that terminal nodes are not factored into the estimation more than once.

Finally, the system selects parent nodes to be candidate cluster nodes based on these estimated likelihoods (step 906). At the end of this "parent picking" process, the system has a set of candidate clusters to consider along with their activations.

Figure 10:
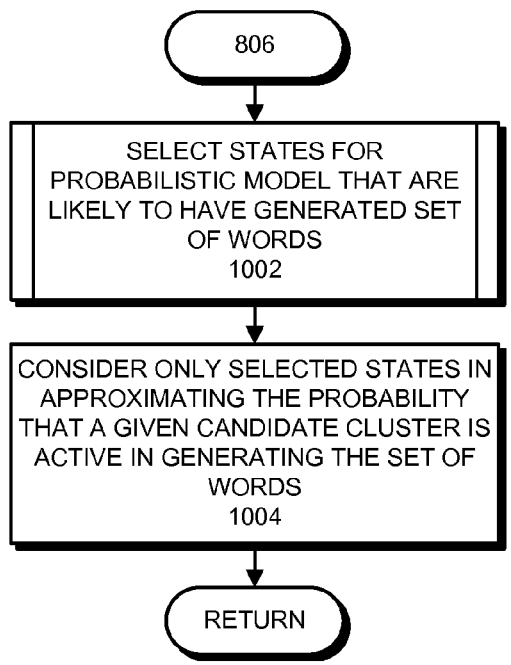
FIG. 10 presents a flow chart of the process of approximating probabilities for candidate clusters in accordance with an embodiment of the present invention.

FIG. 10 presents a flow chart of the process of approximating probabilities for candidate clusters in accordance with an embodiment of the present invention. The system first selects states for the probabilistic model that are likely to have generated the set of words (step 1002).

Next, the system constructs the vector, wherein the vector includes components for candidate clusters. Each of these components indicates a likelihood that a corresponding candidate cluster is active in generating the set of words. In order to estimate a component, the system considers only selected states in approximating the probability that an associated candidate cluster is active in generating the set of words (step 1004).

More specifically, in one embodiment of the present invention, the system calculates a given component $V_i$ of the vector associated with a cluster node $C_i$ to be, $$V_i = \text{Activation}(C_i) \times P(C_i),$$

wherein the Activation($C_i$) is an indicator of the number of links that will fire if node $C_i$ fires, and wherein $P(C_i)$ is the probability that $C_i$ is active in generating the set of words in the document.

$P(C_i)$ can be calculated as, $$P(C_i) = \frac{\sum P_{network}(C_i \text{ is on})}{\sum P_{network}(\text{explored})}.$$

This formula indicates that $P(C_i)$ is the sum of the network probabilities for networks in which $C_i$ is discovered to be active divided by the sum of all network probabilities for networks that have been explored.

The probability of a given network state occurring can be calculated as, $$P_{network} = \prod_{\substack{\text{nodes } j \\ \text{that are on}}} \left(1 - \prod_{\substack{\text{nodes } i \text{ that are} \\ \text{on and point to } j}} (1 - w_{i \to j})\right) \prod_{\substack{\text{nodes } k \\ \text{that are off}}} \left(\prod_{\substack{\text{nodes } i \text{ that are} \\ \text{on and point to } k}} (1 - w_{i \to k})\right)$$

This probability includes contributions from nodes that are "on". More specifically, for each node j that is on in a given network, the system computes the probability that at least one link into j (from an active parent node i) fires. This is one minus the probability that no link into j from an active parent node i fires, wherein the probability that a link from an active node does not fire is one minus the link weight.

The probability also includes contributions from nodes k that are "off". For a given node k that is off, the contribution is the probability that no link points to k from active node i, which is simply the product of one minus the link weights.

Figure 11:
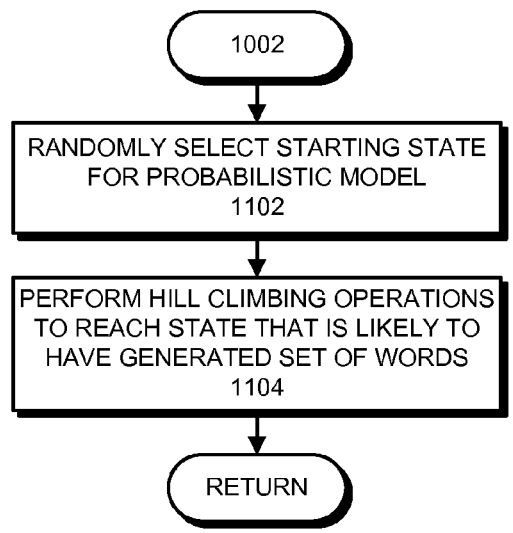
FIG. 11 presents a flow chart illustrating how states for the probabilistic model are selected in accordance with an embodiment of the present invention.

FIG. 11 illustrates how states for the probabilistic model are selected in accordance with an embodiment of the present invention. This flow chart describes in more detail the operations involved in performing step 1002 in FIG. 11. In order to limit the amount of computational work involved in selecting states, one embodiment of the present invention considers only candidate cluster nodes and terminal nodes associated with the set of words in the document. All other terminals are assumed to be off and are summarized in a simple term which is used to reduce the probability of the parent being on.

The system starts by randomly selecting a starting state for the probabilistic model (step 1102). Each starting state indicates which nodes in the probabilistic model are active and which ones are not. Note that any starting state is possible because the universal node can trigger any subset of the candidate nodes to fire.

Also note that link weights in the probabilistic model tend to make some states more likely than others in generating the set of words in the document. Hence, it is unlikely that a random starting state would have generated the set of words in the document. In order to find a more likely state, the system performs "hill-climbing" operations to reach a state that is likely to have generated the set of words in the document (step 1104). Note that a large number of well-known hill climbing techniques can be used for this purpose.

A hill-climbing operation, typically changes the state of the system in a manner that increases the value of a specific objective function. In this case, the objective function is the probability of a given network state occurring, $P_{network}$, which is described above.

In one embodiment of the present invention, the system periodically changes the state of an individual candidate cluster between hill-climbing operations without regards to the objective function. In doing so, the system fixes the changed state so it does not change during subsequent hill-climbing operations. This produces a local optimum for the objective function, which includes the changed state, which enables to system to explore states of the probabilistic model that are otherwise unreachable through only hill-climbing operations.

Learning Process

Figure 12:
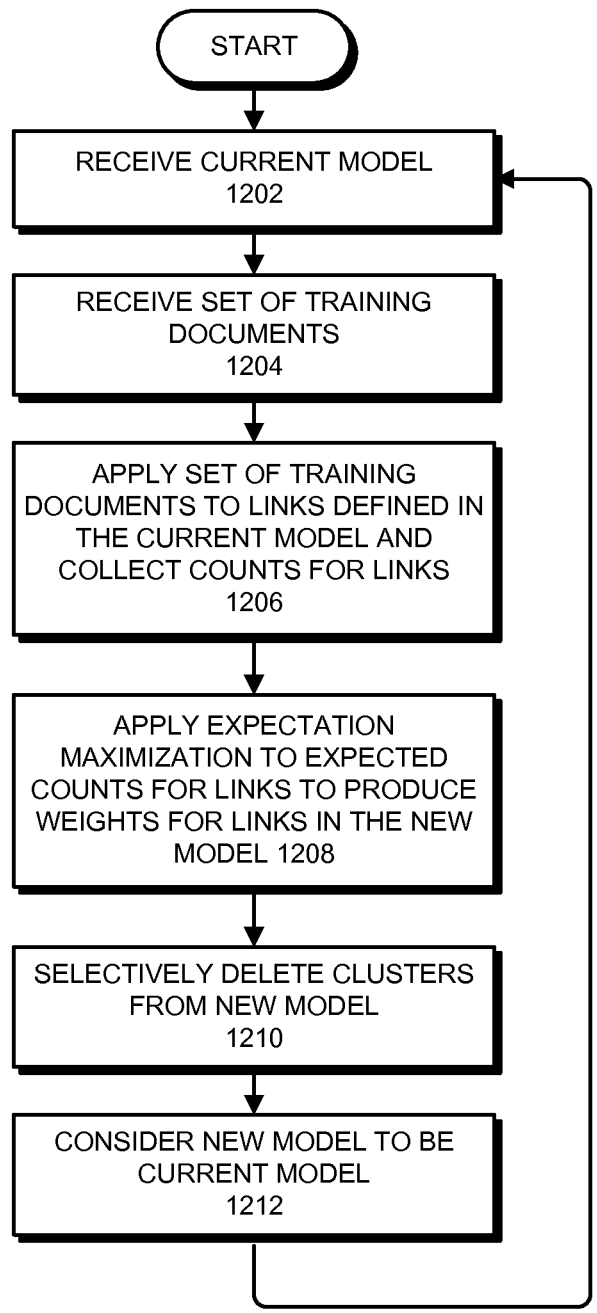
FIG. 12 presents a flow chart summarizing the learning process in accordance with an embodiment of the present invention.

FIG. 12 presents a flow chart summarizing the learning process in accordance with an embodiment of the present invention. During the learning process, the system first receives a current model (step 1202). Note that if no current model exists, an initial current model can be created from a set of words by: (1) generating a universal node that is always active; (2) generating terminal nodes representing words in the set of words; (3) generating cluster nodes by selecting training instances; and (4) directly linking the universal node with all the nodes.

Next, the system receives a set of training documents (step 1204). Note that in one embodiment of the present invention, the system starts with a small set of training documents for an initial iteration, and doubles the number of training documents in each subsequent iteration until all available training documents are used. This allows the system to learn larger concepts, which require fewer training documents to learn, during the earlier iterations.

Next the system applies the set of training documents to links defined in the current model to produce weights for corresponding links in the new model. During this process, the system maintains counters for links and prospective links in the current model to count the expected number of times the links and prospective links are activated during the training process (step 1206), where the expectation is over the probability that the links are activated given the training data Next, the system applies expectation maximization (EM) to the expected counts to produce weights for links in the new model (step 1208).

The system then selectively deletes clusters from the new model (step 1210). This process is described in more detail below with reference to FIG. 13. The system then considers the new model to be the current model (step 1212) and repeats the process for a number of iterations to produce a generative model explains the set of training documents.

Selectively Deleting Cluster Nodes

Figure 13:
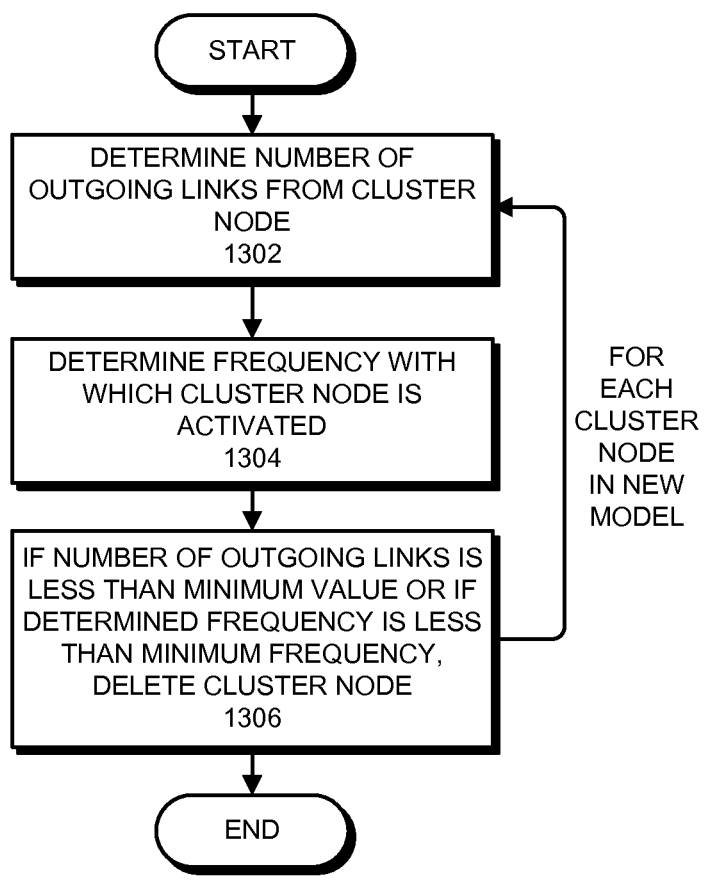
FIG. 13 presents a flow chart of the process of selectively deleting cluster nodes in accordance with an embodiment of the present invention.

FIG. 13 presents a flow chart of the process of selectively deleting cluster nodes in accordance with an embodiment of the present invention. This flow chart illustrates in more detail what takes place during step 1210 in the flow chart illustrated in FIG. 12. During this selective-deletion process, for each cluster node in the new model, the system determines the number of outgoing links from the cluster node to other nodes (step 1302). These other nodes can be terminal nodes associated with words or other cluster nodes. Using the expected counts collected over the training data, the system also determines the frequency with which the cluster node is activated (step 1304). If the number of outgoing links is less than a minimum value, or if the determined frequency is less than a minimum frequency, the system deletes the cluster node (step 1306).

If a cluster node has very few outgoing links, it is not useful for generalizing. Hence, deleting the cluster node reduces memory usage, improves computational efficiency of the model, and improves the quality of clusters returned by the model without adversely affecting the usefulness of the model. Similarly, if a cluster node is rarely activated, deleting the cluster node has similar benefits.

Note that the process of deleting a cluster node from the model involves: (1) deleting outgoing links from the cluster node; (2) deleting incoming links into the cluster node; and (3) deleting the cluster node itself.

Merging Cluster Nodes

Figure 14:
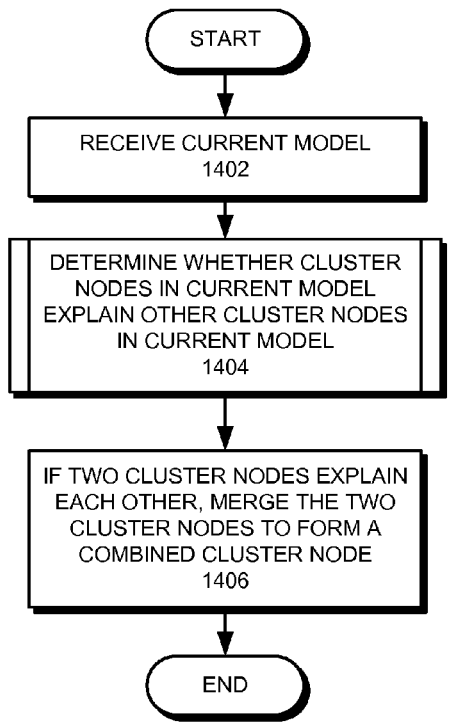
FIG. 14 presents a flow chart illustrating the process of identifying and merging similar cluster nodes in accordance with an embodiment of the present invention.

FIG. 14 presents a flow chart illustrating the process of identifying and merging similar cluster nodes in accordance with an embodiment of the present invention. In one embodiment of the present invention, this merging process takes place during a separate iteration of the training process illustrated in FIG. 13. Note that this merging iteration can be interspersed with the training iterations illustrated in FIG. 13. Referring to FIG. 14, during the merging process the system first receives the current model (step 1402). Next, the system determines whether cluster nodes in the current model "explain" other cluster nodes in the current model (step 1404). (This process is described in more detail below with reference to FIG. 15.) Finally, if two cluster nodes explain each other, the system merges the two cluster nodes to form a combined cluster node (step 1406). (This process is described in more detail below with reference to FIG. 16.)

Determining Which Cluster Nodes Explain a Cluster Node

Figure 15:
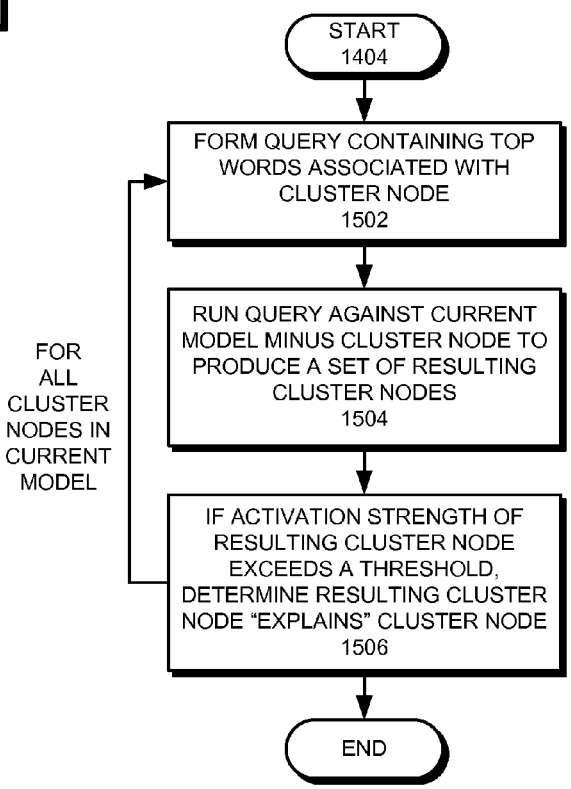
FIG. 15 presents a flow chart illustrating the process of determining whether cluster nodes explain each other in accordance with an embodiment of the present invention.

FIG. 15 presents a flow chart illustrating the process of determining whether cluster nodes explain each other in accordance with an embodiment of the present invention. During this process, the system iteratively analyzes each given cluster node to determine which other cluster nodes explain the given cluster node.

More specifically, for each cluster node, the system forms a query which includes a set of "top words" associated with the cluster node (step 1502). This set of top words can include words whose nodes are most likely to fire if the cluster node fires. Next, the system runs the query against the current model minus the given cluster node to produce a set of resulting cluster nodes (step 1504). More specifically, the given cluster node is temporarily removed from the current model and the query is run against this temporarily modified model. The query produces a set of resulting cluster nodes.

Finally, if the activation strength of a resulting cluster node exceeds a threshold, the system determines that the resulting cluster node explains the given cluster node (step 1505).

Merging Two Cluster Nodes to Form A Combined Cluster Node

Figure 16:
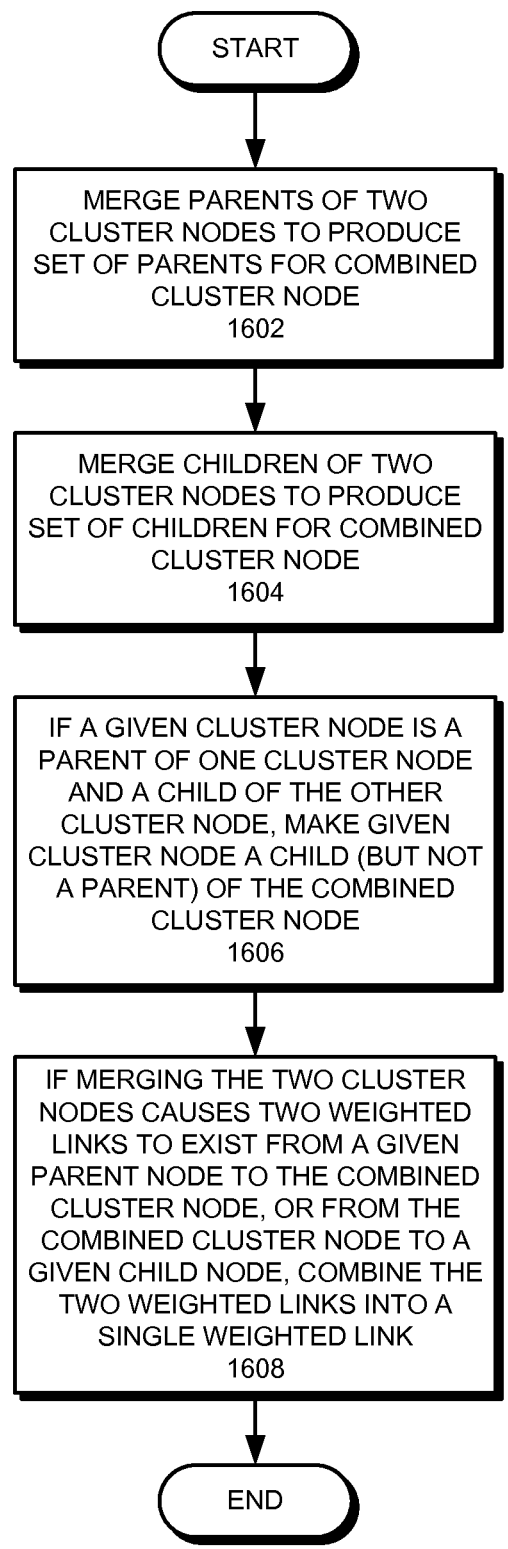
FIG. 16 presents a flow chart illustrating the process of merging two cluster nodes to form a combined cluster node in accordance with an embodiment of the present invention.

FIG. 16 presents a flow chart illustrating the process of merging two cluster nodes to form a combined cluster node in accordance with an embodiment of the present invention. During this process, the system merges the parents of the two cluster nodes to produce a set of parents for the combined cluster node (step 1602). The system also merges the children of the two cluster nodes to produce a set of children for the combined cluster node (step 1604).

In the special case where a given cluster node is a parent of one cluster node and a child of the other cluster node, the system makes the given cluster node a child but not a parent of the combined cluster node (step 1606). This makes sense because in our model parent nodes occur more frequently than their child nodes. Because the combined cluster node will by definition be more frequent than the given cluster node, the given cluster node should be a child and not a parent of the combined cluster node.

Finally, if merging the two cluster nodes causes two weighted links to exist from a given parent node to the combined cluster node, or from the combined cluster node to a given child node, the system combines the two weighted links into a single combined weighted link (step 1608). The weight on this combined weighted link can be calculated by exponentially combining (or even adding) the weights of the two weighted links. Note that any reasonable approximation for the combined weight can be used because subsequent iterations of the training process will further refine the weight on this combined weighted link.

Uses of the Model

This section outlines some of the possible uses of our model.

(1) Guessing at the concepts behind a piece of text. The concepts can then be displayed to a user allowing the user to better understand the meaning behind the text.

(2) Comparing the words and concepts between a document and a query. This can be the information retrieval scoring function that is required in any document search engine, including the special case where the documents are web pages.

(3) A different way of using our model for web search is to assume that the distribution of clusters extends the query. For example, a query for the word "jaguar" is ambiguous. It could mean either the animal or the car. Our model will identify clusters that relate to both meanings in response to this search. In this case, we can consider that the user typed in one of either two queries, the jaguar (CAR) query or the jaguar (ANIMAL) query. We can then retrieve documents for both of these queries taking into account the ratio of their respective clusters' probabilities. By carefully balancing how many results we return for each meaning, we assure a certain diversity of results for a search.

(4) Comparing the words and concepts between a document and an advertisement. This can be used as a proxy for how well an advertisement will perform if attached to a certain piece of content. A specialization of this is attaching advertisements to web pages.

(5) Comparing the words and concepts between a query and an advertisement (or targeting criteria for an advertisement). In search engines, advertisers often select a set of "targeting criteria", which when they show up in user queries, and ad is served. The text of these criteria (and the ad copy itself) can be compared to a query via the use of clusters in our model. This comparison can be a proxy for how well the ad will perform if served on a search page resulting from the query.

(6) Comparing the words and concepts between two documents. This can be used as a distance metric for conceptual clustering of documents, where similar documents are grouped together.

(7) Projecting text into the space of clusters. The probabilities of clusters in the text can be used as features for an arbitrary classification task. For example, a pornography filter can be produced by projecting the text of a page onto clusters, and then building a classifier that uses the clusters and the words as its input.

(8) Generalizing a web query to retrieve more results, using the bit cost or probability of a set of words or terminals given their parent clusters.

(9) Guessing at whether a particular word is a misspelling of another word by looking at the concepts induced by the two words.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:

receiving, by at least one processor, a search query comprising one or more terms from a device of a user;

in response to the received search query, accessing, by the at least one processor, data identifying contents of one or more web pages;

obtaining, by the at least one processor, a probabilistic generative model that includes (i) a first node that descends from one or more parent nodes, and (ii) one or more child nodes that descend from a second node;

determining, by the at least one processor, to merge the first node that descends from the one or more parent nodes of the first node with the second node from which the one or more child nodes of the second node descend;

in response to determining to merge the first node that descends from the one or more parent nodes of the first node with the second node from which the one or more child nodes of the second node descend, determining that, before the first node and the second node are merged, a particular node of the probabilistic generative model is both (i) one of the one or more parent nodes of the first node, and (ii) one of the one or more child nodes of the second node, then, after the first node and the second node are merged, designating the particular node as (i) a child node that descends from a combined node that results from merging the first node with the second node, and (ii) not a parent node from which the combined node that results from merging the first node with the second node descends;

generating, by the at least one processor, a first concept characterizing the search query and one or more second concepts characterizing each of the web pages using the probabilistic generative model;

determining, by the at least one processor, that at least one of the second concepts matches the first concept, the at least one second concept being associated with at least one of the web pages; and transmitting, to the user device, a response to the search query that identifies the at least one of the web pages.

2. The method of claim 1, further comprising:

determining, based on the probabilistic generative model, that the first node explains the second node; ands wherein determining to merge the first node that descends from the one or more parent nodes of the first node with the second node from which the one or more child nodes of the second node descend to generate the combined node comprises:

based on determining that the first node explains the second node, determining to merge the first node that descends from the one or more parent nodes of the first node with the second node from which the one or more child nodes of the second node descend to generate the combined node.

3. The method of claim 2, further comprising:
receiving a set of training documents, wherein each training document contains a set of terms;
applying the set of training documents to the probabilistic generative model to produce a new probabilistic generative model; and
selecting the new probabilistic generative model as the probabilistic generative model.

4. The method of claim 2, wherein obtaining the probabilistic generative model comprises:
obtaining a probabilistic generative mode that includes (i) a first node that descends from one or more respective parent nodes, (ii) a second node that descends from one or more respective parent nodes, (iii) one or more child nodes that descend from the first node, and (iv) one or more child nodes that descend from the second node; and
wherein the method further comprises:
merging the one or more parent nodes from which the first node descends with the one or more parent nodes from which the second node descends to produce a set of parent nodes for the combined node; and
merging the one or more child nodes that descend from the first node with the one or more child nodes that descend from the second node to produce a set of children nodes for the combined node.

5. The method of claim 2, wherein determining, based on the probabilistic generative model, that the first node explains the second node comprises:
generating, for the second node, a query that includes a set of terms associated with the second node;
processing the generated query using a modified probabilistic generative model to generate a set of resulting nodes, wherein the resulting nodes include the first node; and
determining that the first node explains the second node based on an activation strength of the first node exceeding a threshold.

6. The method of claim 5, wherein the modified probabilistic generative model comprises the probabilistic generative model without the second node.

7. The method of claim 5, wherein the set of terms comprise terms that correspond to nodes that are classified as being likely to fire when the second node fires.

8. The method of claim 1, wherein obtaining the probabilistic generative model further comprises:
obtaining a probabilistic generative model whose nodes (I) each correspond to a different cluster of terms in the probabilistic generative model, and (II) include (i) a first node that descends from one or more parent nodes, and (ii) one or more child nodes that descend from a second node.

9. The method of claim 8, wherein determining to merge the first node that descends from the one or more parent nodes of the first node with the second node from which the one or more child nodes of the second node descend comprises:
determining to merge the first node that corresponds to a first cluster of terms in the probabilistic generative model with the second node corresponds to a second cluster of terms in the probabilistic generative model to generate the combined node that corresponds to the first and second clusters of terms in the probabilistic generative model.

10. A system comprising:
a non-transitory computer readable medium having instructions stored thereon; and
data processing apparatus programmed to execute the instructions to perform operations comprising:
receiving, from a device of a user, a search query comprising one or more terms;
in response to the received search query, accessing data identifying contents of one or more web pages;
obtaining a probabilistic generative model that includes (i) a first node that descends from one or more parent nodes, and (ii) one or more child nodes that descend from a second node;
determining to merge the first node that descends from the one or more parent nodes of the first node with the second node from which the one or more child nodes of the second node descend;
in response to determining to merge the first node that descends from the one or more parent nodes of the first node with the second node from which the one or more child nodes of the second node descend, determining that, before the first node and the second node are merged, a particular node of the probabilistic generative model is both (i) one of the one or more parent nodes of the first node, and (ii) one of the one or more child nodes of the second node, then, after the first node and the second node are merged, designating the particular node as (i) a child node that descends from a combined node that results from merging the first node with the second node, and (ii) not a parent node from which the combined node that results from merging the first node with the second node descends;
generating a first concept characterizing the search query and one or more second concepts characterizing each of the web pages using the probabilistic generative model;
determining that at least one of the second concepts matches the first concept, the at least one second concept being associated with at least one of the web pages; and
transmitting, to the user device, a response to the search query that identifies the at least one of the web pages.

11. The system of claim 10, wherein the operations further comprise:
determining, based on the probabilistic generative model, that the first node explains the second node; and
wherein determining to merge the first node that descends from the one or more parent nodes of the first node with the second node from which the one or more child nodes of the second node descend to generate the combined node comprises:
based on determining that the first node explains the second node, determining to merge the first node that descends from the one or more parent nodes of the first node with the second node from which the one or more child nodes of the second node descend to generate the combined node.

12. The system of claim 11, wherein the operations further comprise:
receiving a set of training documents, wherein each training document contains a set of terms;
applying the set of training documents to the probabilistic generative model to produce a new probabilistic generative model; and
selecting the new probabilistic generative model as the probabilistic generative model.

13. The system of claim 11, wherein obtaining the probabilistic generative model comprises:
  obtaining a probabilistic generative mode that includes (i) a first node that descends from one or more respective parent nodes, (ii) a second node that descends from one or more respective parent nodes, (iii) one or more child nodes that descend from the first node, and (iv) one or more child nodes that descend from the second node; and
  wherein the operations further comprise:
    merging the one or more parent nodes from which the first node descends with the one or more parent nodes from which the second node descends to produce a set of parent nodes for the combined node; and
    merging the one or more child nodes that descend from the first node with the one or more child nodes that descend from the second node to produce a set of children nodes for the combined node.

14. The system of claim 11, wherein determining, based on the probabilistic generative model, that the first node explains the second node comprises:
  generating, for the second node, a query that includes a set of terms associated with the second node;
  processing the generated query using a modified probabilistic generative model to generate a set of resulting nodes, wherein the resulting nodes include the first node; and
  determining that the first node explains the second node based on an activation strength of the first node exceeding a threshold.

15. The system of claim 14, wherein the modified probabilistic generative model comprises the probabilistic generative model without the second node.

16. The system of claim 14, wherein the set of terms comprise terms that correspond to nodes that are classified as being likely to fire when the second node fires.

17. A non-transitory computer-readable medium having instructions stored thereon that, when executed by a processor, cause the processor to perform operations comprising:
  receiving, from a device of a user, a search query comprising one or more terms;
  in response to the received search query, accessing data identifying contents of one or more web pages;
  obtaining a probabilistic generative model that includes (i) a first node that descends from one or more parent nodes, and (ii) one or more child nodes that descend from a second node;
  determining to merge the first node that descends from the one or more parent nodes of the first node with the second node from which the one or more child nodes of the second node descend;
  in response to determining to merge the first node that descends from the one or more parent nodes of the first node with the second node from which the one or more child nodes of the second node descend, determining that, before the first node and the second node are merged, a particular node of the probabilistic generative model is both (i) one of the one or more parent nodes of the first node, and (ii) one of the one or more child nodes of the second node, then, after the first node and the second node are merged, designating the particular node as (i) a child node that descends from a combined node that results from merging the first node with the second node, and (ii) not a parent node from which the combined node that results from merging the first node with the second node descends;
  generating a first concept characterizing the search query and one or more second concepts characterizing each of the web pages using the probabilistic generative model;
  determining that at least one of the second concepts matches the first concept, the at least one second concept being associated with at least one of the web pages; and
  transmitting, to the user device, a response to the search query that identifies the at least one of the web pages.

18. The medium of claim 17, wherein the operations further comprise:
  determining, based on the probabilistic generative model, that the first node explains the second node; and
  wherein determining to merge the first node that descends from the one or more parent nodes of the first node with the second node from which the one or more child nodes of the second node descend to generate the combined node comprises:
    based on determining that the first node explains the second node, determining to merge the first node that descends from the one or more parent nodes of the first node with the second node from which the one or more child nodes of the second node descend to generate the combined node.

19. The medium of claim 18, wherein the operations further comprise:
  receiving a set of training documents, wherein each training document contains a set of terms;
  applying the set of training documents to the probabilistic generative model to produce a new probabilistic generative model; and
  selecting the new probabilistic generative model as the probabilistic generative model.

20. The medium of claim 18, wherein obtaining the probabilistic generative model comprises:
  obtaining a probabilistic generative mode that includes (i) a first node that descends from one or more respective parent nodes, (ii) a second node that descends from one or more respective parent nodes, (iii) one or more child nodes that descend from the first node, and (iv) one or more child nodes that descend from the second node; and
  wherein the operations further comprise:
    merging the one or more parent nodes from which the first node descends with the one or more parent nodes from which the second node descends to produce a set of parent nodes for the combined node; and
    merging the one or more child nodes that descend from the first node with the one or more child nodes that descend from the second node to produce a set of children nodes for the combined node.

21. The medium of claim 18, wherein determining, based on the probabilistic generative model, that the first node explains the second node comprises:
  generating, for the second node, a query that includes a set of terms associated with the second node;
  processing the generated query using a modified probabilistic generative model to generate a set of resulting nodes, wherein the resulting nodes include the first node; and
  determining that the first node explains the second node based on an activation strength of the first node exceeding a threshold.

* * * * *